United States Patent
Okamoto (10) Patent No.: US 7,052,789 B2
(45) Date of Patent: May 30, 2006

(54) CONTROL DEVICE FOR FUEL CELL SYSTEM AND CONTROL METHOD

(75) Inventor: Masaru Okamoto, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 387 days.

(21) Appl. No.: 10/432,591

(22) PCT Filed: Oct. 2, 2002

(86) PCT No.: PCT/JP02/10254

§ 371 (c)(1),
(2), (4) Date: Jun. 2, 2003

(87) PCT Pub. No.: WO03/034527

PCT Pub. Date: Apr. 24, 2003

(65) Prior Publication Data

US 2004/0028968 A1    Feb. 12, 2004

(30) Foreign Application Priority Data

Oct. 16, 2001    (JP)    ............................ 2001-317968

(51) Int. Cl.
  *H01M 8/04* (2006.01)
(52) U.S. Cl. .......................................... 429/24; 429/23
(58) Field of Classification Search .................. 429/24, 429/23, 13; 701/22
  See application file for complete search history.

(56) References Cited

U.S. PATENT DOCUMENTS 6,374,166 B1    4/2002    Takeda
6,645,653 B1 *  11/2003   Kashiwagi .................... 429/22
2001/0014414 A1  8/2001   Okamoto et al.
2002/0160243 A1  10/2002  Ueda et al.

FOREIGN PATENT DOCUMENTS

| DE | 100 21 720 A1 | 7/2001 |
| EP | 1 160 120 A2 | 12/2001 |
| JP | 03-122971 A | 5/1991 |
| JP | 07-075214 A | 3/1995 |
| JP | 2000-315516 A | 11/2000 |
| JP | 2001-266918 A | 9/2001 |
| JP | 2001-338665 A | 12/2001 |
| JP | 2001-339810 A | 12/2001 |

* cited by examiner

*Primary Examiner*—Patrick Joseph Ryan
*Assistant Examiner*—Thomas H. Parsons
(74) *Attorney, Agent, or Firm*—Foley & Lardner LLP (57) ABSTRACT

A control device for a fuel cell system has a fuel cell body, a fuel gas supply system supplying fuel gas to the fuel cell body in dependence on a demanded power output of the fuel cell body; an air supply system supplying air to the fuel cell body in dependence on the demanded power output, a combustor combusting exhaust gases exhausted from the fuel cell body, a temperature sensor sensing a temperature of the combustor, a discriminator section discriminating whether an increase in the temperature as sensed is equal to or above a predetermined threshold value when the demanded power output increases, and a permitting section permitting the power output available from the fuel cell body to be increased when the discriminator section discriminates that the increase in the temperature as sensed is equal to or above the predetermined threshold value.

13 Claims, 7 Drawing Sheets

POWER OUTPUT OF STACK

FIG.4B

HYDROGEN FLOW RATE AT STACK INLET

FIG.4C

CELL VOLTAGE

FIG.4D

TEMPERATURE OF COMBUSTOR

CONTROL DEVICE FOR FUEL CELL SYSTEM AND CONTROL METHOD

TECHNICAL FIELD

The present invention relates to a control device for a fuel cell system and a control method and, more particularly, to a control device for a fuel cell system and a control method that enable power output of a fuel cell body to be controlled in dependence on the temperature of a combustor which combusts exhaust gases exhausted from the fuel cell body.

BACKGROUND ART

In recent years, a great attention is focused onto a solid polymer membrane fuel cell, as a household power supply and a power supply for a vehicle, which uses a solid polymer membrane as an electrolyte of a fuel cell to lower its operating temperature while providing a miniaturized and light weight structure.

A fuel cell body usually includes a fuel electrode supplied with fuel gas, and an air electrode supplied with air, with hydrogen contained in the fuel gas and oxygen contained in air being electrochemically reacted to generate electric power output. Unused exhaust fuel gas and unused exhaust air, which are not consumed in the fuel cell body for generation of electric power output, are introduced to a combustor and combusted therein to produce a reaction product, which is composed of steam and inactive nitrogen and is expelled as harmless exhaust.

A power generation capacity of the fuel cell body depends on a partial pressure of hydrogen supplied to the fuel electrode and a partial pressure of oxygen in air supplied to the air electrode at a flow rate depending on the partial pressure of hydrogen. If the power output is taken out from the fuel cell body at a rate greater than such a power generation capacity, not only the fuel cell body encounters a deterioration in a power generating performance but also catalysts of the fuel electrode and the air electrode become high temperature to be adversely affected, or an electrolyte membrane (proton permeable membrane) are adversely affected.

For this reason, when taking out the power output from the fuel cell body, operations are required to confirm whether the fuel electrode of the fuel cell body is fully filled with fuel gas and to control the fuel cell body in a way to produce controlled power output to prevent an overload exceeding the power generating capacity.

Japanese Patent Application Laid-Open Publication No. 2000-315516 discloses a control device for a fuel cell system. With such a control device, when reforming feed materials in a reformer to produce hydrogen rich reformed gas, operation is executed to estimate the amount of resulting hydrogen from the flow rates of feed materials supplied to the reformer and the reformer temperature, and the fuel cell body is operated to produce the power output in dependence on such an estimated value.

DISCLOSURE OF INVENTION

However, with such a structure, it is conceivable that a time delay occurs during operations in which the flow rates of feed materials introduced to an evaporator are increased responsive to an increase in a demanded power output to reform feed materials for producing hydrogen gas and then the flow rate of the hydrogen gas to be delivered to the fuel electrode is increased to an intended value so as to meet the increase in the demanded power output.

More specifically, the time delay in which hydrogen gas is delivered to the stacked hydrogen electrodes varies according to a capacity of the evaporator, an evaporating time period, a capacity of the reformer, a reforming reaction time period, a pressure of gas feeding in a supply line between the reformer and the fuel electrode, and the flow rate of gas passing through the supply line. Since this time delay varies in dependence on a status and operating condition of the system, it is hard to obtain an accurately estimated result and, thus, it is difficult to precisely estimate the pressure and flow rate of hydrogen gas reaching to the fuel electrode.

On the other hand, if the estimated value of the hydrogen flow rate is deviated from a correct value, no expedient is found to detect such deviation, resulting in an occurrence of an unreliable operation to cause the power output to be taken out from the fuel cell body in response to a deviated estimation result of the flow rate of hydrogen gas. Especially in a transient state, variation in the flow rate of fuel gas in the fuel electrode supply line to the fuel cell body results in an adverse affect on variation in the pressure of the fuel gas in the fuel electrode supply line, tending to cause an extensive amount of deviation to occur between the estimated value and the actual value.

And, if a situation arises where the estimated value is greater than the actual value, there is a possibility such that from the fuel cell body, the power output is taken out at a rate greater than the power generation capacity of the fuel cell body, with a resultant provability of a deterioration caused in the fuel cell body.

Further, even if such a structure is added with a configuration which detects the presence of a decrease in the output voltage of the fuel cell body for thereby enabling discrimination of reformed gas being insufficiently supplied to the fuel electrode of the fuel cell body in a shortage condition, it is hard to judge, prior to an operation in which the output voltage of the fuel cell body drops, whether the fuel electrode supply line of the fuel cell body is fully filled with fuel gas. As a result, a provability remains in which the power output is temporarily taken out from fuel cell body at the rate greater than its power generating capacity.

The present invention has completed conducting extensive studies previously mentioned and has an object to provide a control device for a fuel cell system and a control method which are able to preclude a power output from being taken out from a fuel cell body at a rate above a power generation capacity thereof for thereby avoiding deterioration in an operating performance of a fuel cell.

To achieve the above object, according to one aspect of the present invention, there is provided a control device for a fuel cell system, comprising: a fuel cell body; a fuel gas supply system supplying fuel gas to the fuel cell body in dependence on a demanded power output of the fuel cell body; an air supply system supplying air to the fuel cell body in dependence on the demanded power output; a combustor combusting exhaust gases exhausted from the fuel cell body; a temperature sensor sensing a temperature of the combustor; a temperature variation discriminator section discriminating whether an increase in the temperature detected with the temperature sensor is equal to or above a predetermined threshold value when there is an increase in the demanded power output; and a power output increase permitting section permitting the power output available from the fuel cell body to be increased when it is discriminated by the temperature variation discriminator section that the increase in the temperature is equal to or above the predetermined threshold value.

Stated another way, the present invention provides a control device for a fuel cell system, comprising: a fuel cell body; a fuel gas supplying means for supplying fuel gas to the fuel cell body in dependence on a demanded power output of the fuel cell body; an air supplying means for supplying air to the fuel cell body in dependence on the demanded power output; a combusting means for combusting exhaust gases exhausted from the fuel cell body; a temperature sensing means for sensing a temperature of the combusting means; a temperature variation discriminating means for discriminating whether an increase in the temperature detected with the temperature sensor is equal to or above a predetermined threshold value when there is an increase in the demanded power output; and a power output increase permitting means for permitting the power output available from the fuel cell body to be increased when it is discriminated by the temperature variation discriminating means that the increase in the temperature is equal to or above the predetermined threshold value.

On the other hand, the present invention provides a control method for a fuel cell system having a fuel cell body, a fuel gas supply system supplying fuel gas to the fuel cell body in dependence on a demanded power output of the fuel cell body, an air supply system supplying air to the fuel cell body in dependence on the demanded power output, and a combustor combusting exhaust gases exhausted from the fuel cell body, the control method comprising: detecting a temperature of the combustor; discriminating whether an increase in the temperature thus detected is equal to or above a predetermined threshold value when the demanded power output increases; and permitting the power output available from the fuel cell body to be increased when it is discriminated that the increase in the temperature is equal to or above the predetermined threshold value.

Other and further features, advantages, and benefits of the present invention will become more apparent from the following description taken in conjunction with the following drawings.

BEST MODE FOR CARRYING OUT THE INVENTION

To describe the present invention below more in detail, a control device for a fuel cell system and a control method of each embodiment according to the present invention will be explained below with reference to the accompanied drawings.

(First Embodiment)

Referring now to FIGS. 1 to 4, a control device for a fuel cell system and a control method of a first embodiment according to the present invention is described below in detail.

Figure 1:
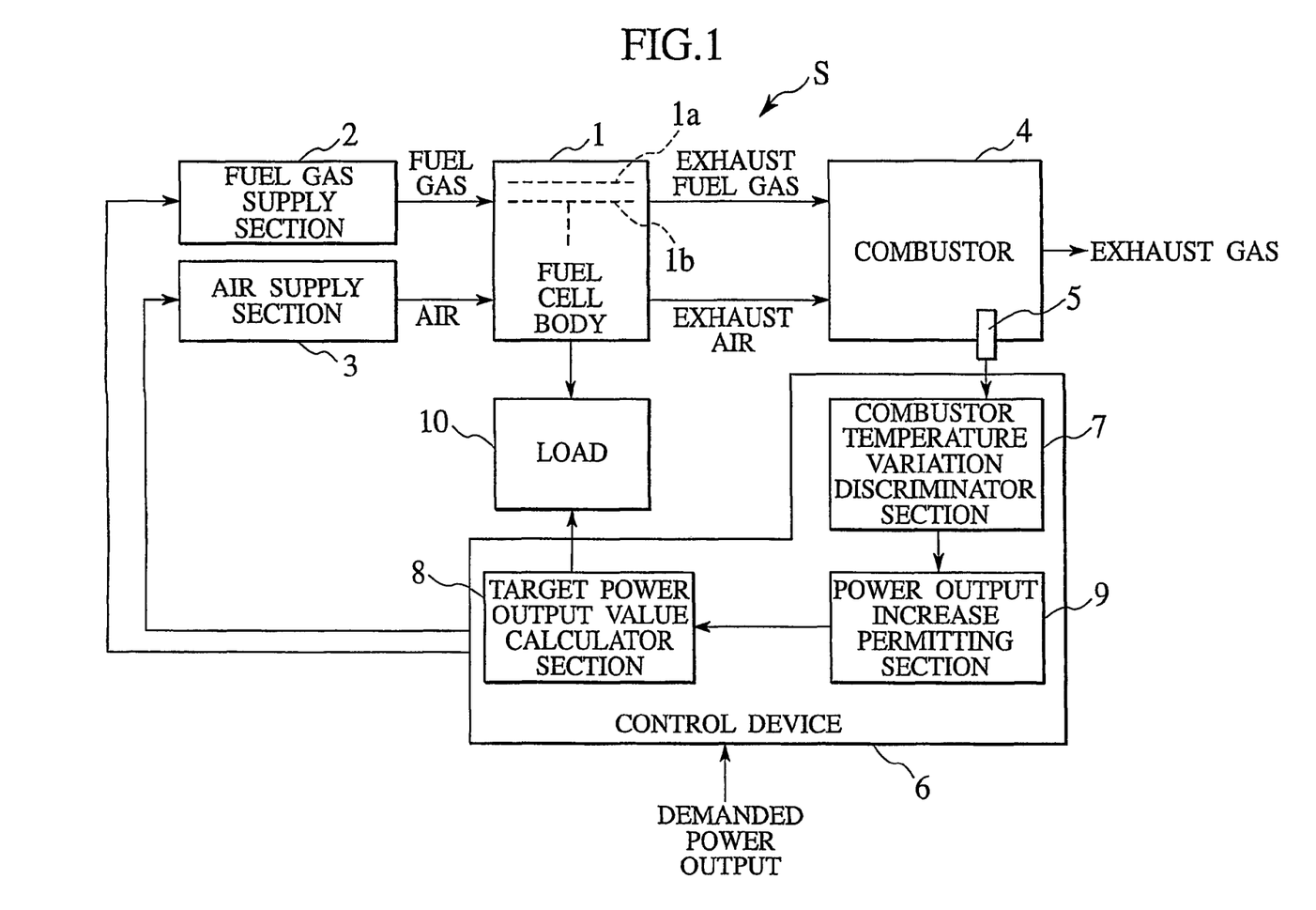
FIG. 1 is a block diagram illustrating a principal structure of a control device for a fuel cell system of a first embodiment according to the present invention.

FIG. 1 is a block diagram for illustrating the control device of the presently filed embodiment according to the present invention.

In FIG. 1, the fuel cell system S is comprised of a fuel cell body 1 having a fuel electrode 1a and an air electrode 1b to generate electric power output, a fuel gas supply section 2 which supplies fuel gas to the fuel electrode 1a in dependence on and in response to a demanded power output of the fuel cell body 1, an air supply section 3 which supplies air to the air electrode 1b in dependence on and in response to the demanded power output, a combustor 4 which combusts exhaust fuel gas and exhaust air (both hereinafter preferably referred to as unused exhaust gases), a temperature sensor 5 which detects a temperature of the combustor 4, a control device 6 which controls the fuel cell system S, and a load 10 adapted to be supplied with electric power output from the fuel cell body 1.

The control device 6 includes a combustor temperature discriminator section 7 which calculates and discriminates whether an amount of the increase in the temperature detected with the temperature sensor 5 is equal to or exceeds a predetermined threshold value or is below the same, a power output increase permitting section 9 which permits the power output available from the fuel cell body 1 to be increased when the combustor temperature variation discriminator section 7 discriminates the amount of the increase in the temperature equal to or exceeding a predetermined threshold value, and a target power output value calculator section 8 which calculates a target power output value of the fuel cell body 1 so as to cause the combustor 4 to maintain its operating temperature at a predetermined level in a case where the power output increase permitting section 9 has permitted the power output to be increased.

The operation of the control device 6 with such a structure is briefly described below.

First, in general, the control apparatus 6 is applied with a demanded power output indicative of a power output demanded to the fuel cell body 1 from a demanded power output commander (device which calculates a demanded power output in response to an incremental depressed displacement of an accelerator pedal and a vehicle speed in an application where the fuel cell system S is incorporated in a fuel cell powered motor vehicle) which is not shown. The control device 6 monitors such a demanded power output and the combustor temperature detected with the temperature sensor 5 for each control cycle of a fixed time interval.

And, the control device 6 operates to control the fuel gas supply section 2 and the air supply section 3 such that when the demanded power output increases, fuel gas and air are delivered to the fuel electrode 1a and the air electrode 1b of the fuel cell body 1 at respective flow rates in dependence on the amount of the increase in the demanded power output.

However, even when operations by the control device 6 are executed to command the fuel gas supply section 2 and the air supply section 3 so as to increase the flow rate of fuel gas and the flow rate of air, respectively, there exists a time delay until the flow rates of these gases reach respective predetermined values due to volumes of these gases, response times and volumes of gas supply lines. And, after an elapse of such time delay, the flow rate of fuel at the fuel electrode 1a and the flow rate of air at the air electrode 1b begin to increase, resulting in an increase in the power output to be available from the fuel cell body 1.

On the other hand however, when this takes place, because the control device 6 does not provide a permission yet to cause the power output to be increased, the power output available from the fuel cell body 1 can not increase in an actual practice and, hence, the volume of fuel gas and the volume of air which are unused in the fuel cell body 1 increase, with a resultant increase in the volumes of fuel gas and air to be combusted in the combustor 4. As a consequence, the temperature of the combustor 4 is raised, with the temperature rise being detected with the temperature sensor 5 which produces a temperature detection signal to be delivered to the control device 6.

In particular, the combustor temperature variation discriminator section 7 of the control device 6 discriminates whether the temperature rise of the combustor is equal to or exceeds a predetermined threshold level on the basis of the temperature of the combustor 4 detected with the temperature sensor 5 and, if so, delivers a discrimination signal, indicative of the temperature rise equal to or exceeding the predetermined threshold level, to the power output increase permitting section 9. Subsequently, in an event that the temperature rise of the combustor 4 is equal to or exceeds the predetermined threshold level, the power output increase permitting section 9 permits the power output available from the fuel cell body 1 to be increased. In succeeding step, if the power output increase permitting section 9 permits the power output to be increased, the target power output value calculator section 8 calculates a target power output value of the fuel cell body 1 so as to maintain the temperature of the combustor 4 at a predetermined level, producing a command, indicative of the target power output value, to be delivered to the load 10.

With such a structure set forth above, the control device typically has a structure which, prior to the flow rate of fuel gas beginning to increase in the fuel supply line of the fuel cell body, precludes the power output available from the fuel cell body 1 from being increased, resulting in a capability of avoiding deterioration in the fuel cell due to its overload.

Figure 2:
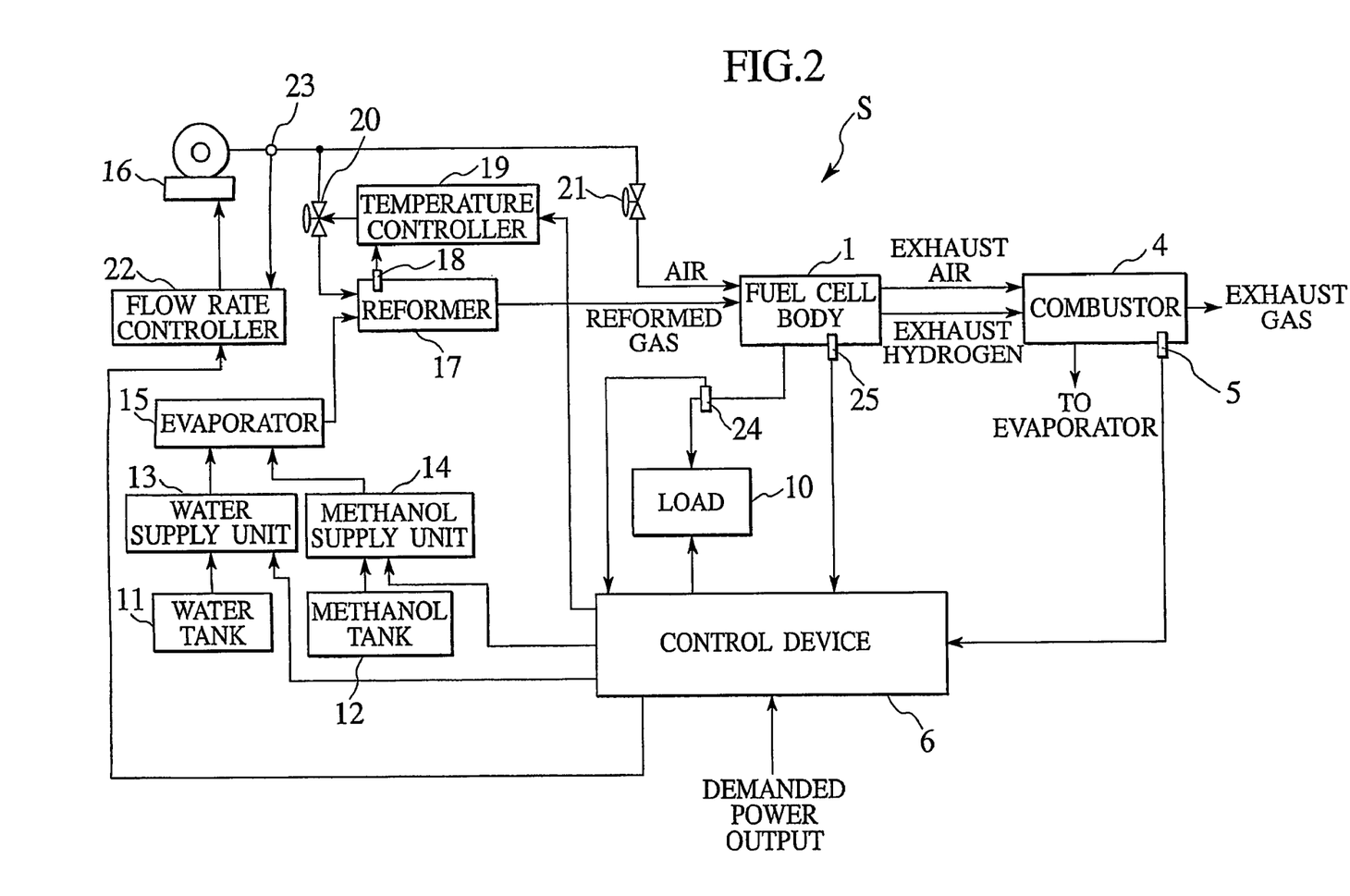
FIG. 2 is a block diagram for illustrating a structure of the fuel cell system including the control device shown in FIG. 1 of the first embodiment.

Referring now to FIG. 2, a further detailed structure of the fuel cell system S of the presently filed embodiment is described below. In the presently filed embodiment, though not to be construed as limiting feed materials, water and methanol are used as feed materials to obtain hydrogen containing fuel gas. That is, though not to be intended as limiting a particular configuration, the fuel cell system S is described below as having a fundamental structure in which unused exhaust gases (exhaust hydrogen and exhaust air) emitted from the fuel cell body 1 are used as fuels for the combustor 4 which creates heat by which an evaporator 15 is heated up to evaporate feed materials for producing feed vapor which is reacted with oxygen in air in a reformer 17 to form hydrogen rich reformed gas. Reformed gas and air are supplied to the fuel electrode and the air electrode, respectively, such that hydrogen of reformed gas and oxygen in air are electrochemically reacted in the fuel cell body 1 for thereby producing electric power output.

In FIG. 2, the fuel cell system S is comprised of a water tank 11 which stores water as feed material, a methanol tank 12 which stores methanol as feed material, a water supply unit 13 which supplies water from the water tank 11 to the evaporator 15, a methanol supply unit 14 which supplies methanol from the methanol tank 12 to the evaporator 15, the evaporator 15 which evaporates water and methanol using waste heat of the combustor 4, the reformer 17 which produces hydrogen rich reformed gas by reforming reaction through the use of steam and methanol vapor produced by the evaporator 15, a compressor 16 which serves as an air supply unit to draw outside air and supply compressed air to various parts of the fuel cell system, a flow rate sensor 23 which detects the flow rate of air in the compressor 16, a flow rate controller 22 which controls the flow rate of air supplied by the compressor 16, a temperature sensor 18 which detects the temperature of the reformer 17, an air flow rate control valve 20 which controls the flow rate of air to be supplied to the reformer 17, a temperature controller 19 which controls the temperature of the reformer 17, an air flow rate control valve 21 which controls the flow rate of air to be supplied to the air electrode of the fuel cell body 1, the fuel cell body 1 which has the air electrode to be supplied with air from the air flow rate control valve 21 and the fuel electrode to be supplied with fuel from the reformer 17, the combustor 4 which combusts exhaust air and exhaust hydrogen emitted the fuel cell body 1, the temperature sensor 5 which detects the temperature of the combustor 4, the load 10 which is supplied with load current from the fuel cell body 1, a current sensor 24 which detects load current, a voltage sensor 25 which detects an output voltage of the fuel cell body 1, and the control device 6 which controls the fuel cell system. In FIG. 2, further, component parts of the fuel gas supply section 2, corresponding to that of FIG. 1, cover the water tank 11, the methanol tank 12, the water supply unit 13, the methanol supply unit 14, the evaporator 15, the reformer 17, the air flow rate control valve 20, the temperature controller 19, and the temperature sensor 18. In FIG. 2, furthermore, component parts which form the air supply section 3, corresponding to that of FIG. 1, cover the compressor 16, the flow rate controller 22, the flow rate sensor 23 and the air flow rate control valve 21.

More particularly, the reformer 17 produces hydrogen rich reformed gas by steam reforming between oxygen contained in air supplied from the compressor 16 and steam formed by evaporating water and methanol of feed materials in the evaporator 15.

Here, the air flow rate control valve 20 is disposed in a midway of an air supply line that supplies air to the reformer 17, with the opening degree of the air flow rate control valve 20 being regulated with the temperature controller 19 such that the reformer 17 is maintained at the target temperature. That is, the flow rate of air to be supplied to the reformer 17 is varied with the temperature controller 19 that is controlled with the control device 6.

Such a reformer 17, though not intended to be limited, is of a shift reaction integrator type that performs a reforming reaction and partial oxidizing reaction using water steam, methanol vapor and air, while removing carbon monoxide resulting from these reactions. And, hydrogen rich reformed gas produced with the reformer 17 is supplied to the fuel electrode of the fuel cell body 1.

The fuel cell body 1 performs electrochemical reaction using oxygen in air supplied from the compressor 16 and hydrogen rich reformed gas to produce electric power output.

A discharge rate of the compressor 16 is measured with the flow rate sensor 23. Here, a total volume of air to be required in the fuel cell system as a whole is supplied from the single compressor 16. To equalize a sum of the flow rates of air required in the reformer 17 and the fuel cell body 1 with the discharge rate of the compressor 16, which the flow rate sensor 23 detects, the rotational speed of the compressor 16 is controlled with the flow rate controller 22 that is controlled with the control device 6.

Unused exhaust gases, which are not used in the fuel cell body 1 for producing electric power output, are composed of exhaust air expelled from the air electrode and exhaust hydrogen expelled from the fuel electrode, with these gases being introduced into the combustor 4 and combusted therein to emit exhaust gases. The combustor 4 is installed with the temperature sensor 5 to detect the temperature thereof, with resulting combustion heat produced by the combustor 4 being supplied to the evaporator 15 to provide a heat value necessary for evaporation of feed materials.

The evaporator 15 is supplied with reforming feed materials from the water supply unit 13 and the methanol supply unit 14. Here, water is supplied from the water tank 11, and methanol is supplied from the methanol tank 12.

Respective target values of the flow rates of water and methanol are calculated in dependence on the demanded power output of the fuel cell body 1, and respective flow rate controllers (not shown) of the water supply unit 13 and the methanol supply unit 14 serve to control the flow rates of water and methanol at respective target values. In a case where the fuel cell system is applied to a vehicle, such as a fuel cell powered motor vehicle, the demanded power output is calculated in dependence on the amount of the increasing displacement of the accelerator pedal depressed by a driver.

The water supply unit 13 and the methanol supply unit 14 are, though not intended to be specifically limited, composed of injectors that inject related feed materials to the evaporator 15 at the inside thereof.

The load 10 is connected to the fuel cell body 1 and forms an object to be supplied with the power output produced thereby. Though not intended to be particularly limited, the load involves a battery and an inverter connected to the fuel cell body 1.

It is structured such that a target power output value is determined for the load 10 to allow the fuel cell body 1 to deliver the target power output to the load 10. The power output is taken out in the form of load current and supplied to an electric motor via the inverter that produces a drive power to propel the vehicle.

The voltage sensor 25 includes a sensor that measures the output voltage of the fuel cell body 1 and, though not intended to be limited, serves to measure a mean value of cell voltages of the fuel cell body 1. Further, the current sensor 24 includes a current sensor that measures load current flowing from the fuel cell body 1 toward the load 10. That is, in an actual practice, the magnitude of the power output of the fuel cell body 1 is obtained as a product of the voltage value detected with the voltage sensor 25 and the load current value detected with the current sensor 24.

Furthermore, the flow rate controller 22, the temperature controller 19 and the control device 6, which form control components of the presently filed embodiment, are realized into practical use using microcomputers having respective CPUs and associated peripheral interfaces and related software.

Figure 3:
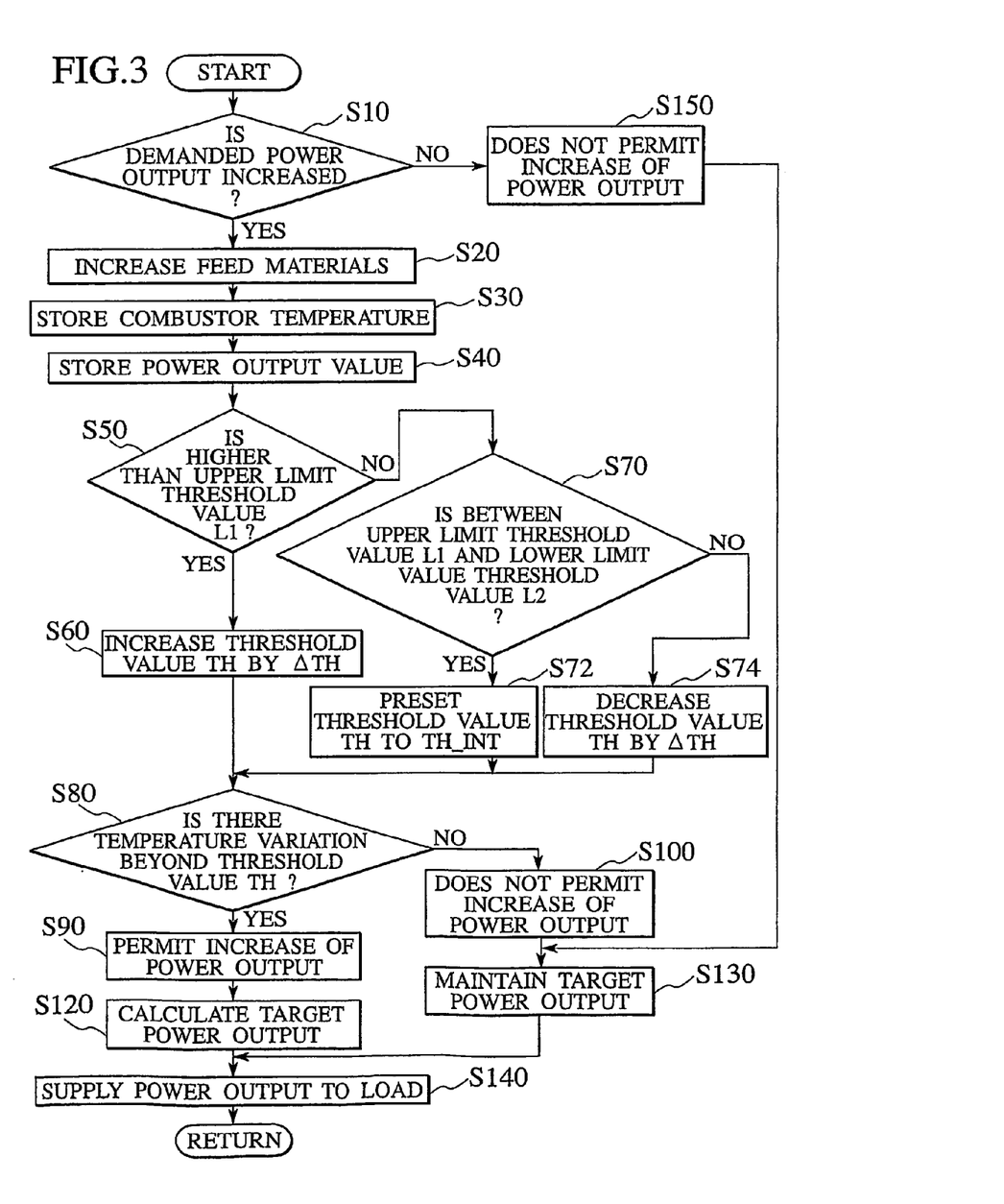
FIG. 3 is a general flow diagram for illustrating the basic sequence of operations of the control device shown in FIG. 1 of the first embodiment.

Now, the operation of the control device 6 of the presently filed embodiment is described more in detail with reference to the general flow diagram of FIG. 3.

In FIG. 3, in first step S10, discrimination is made as to whether there exists an increase in the demanded power output of the fuel cell body 1. A value of the demanded power output of the fuel cell body 1 is typically obtained by mounting a depression displacement sensor to the accelerator pedal, not shown, to detect the increasing displacement value of the accelerator pedal when depressed with the driver and calculating the demanded power output referring to a function which is correlated with the detected increasing displacement value of the accelerator pedal and the vehicle speed, and it is discriminated that when there is an increase between a value in the latest demanded power output and a value of a current demanded power output, there exists the increase in the demanded power output. Such a function is preliminarily stored in a memory (not shown) of the control device 6 in the form of a map and is retrieved for a subsequent operation.

If it is discriminated that there exists the increase in the demanded power output in step S10, then, the operation proceeds to step S20 and, in contrast, if it is discriminated that there is no increase in the demanded power output, then, the operation proceeds to step S150. Also, in the presently filed embodiment, once there has been the increase in the demanded power output, operation is executed to continue the discrimination in that there has been the increase in the demanded power output until the demanded power output value and an actual value of the power output produced from the fuel cell body are brought into coincidence with one another, executing step S20. Further, once there has been an increase in a new demanded power output, the demanded power output value is continuously maintained until an actual power output value of the fuel cell reaches the demanded power output value. The term "demanded power output continuation" refers to a condition where such a demanded power output value is continuously issued.

When the operation proceeds to step S20, this situation corresponds to a case where there is the increase in the demanded power output of the fuel cell body 1 and, therefore, a command is issued to increase the target values of the flow rates of feed materials depending on such an increase for thereby increasing the volumes of feed materials. In particular, since the presently filed embodiment is structured to allow the evaporator 15 to evaporate feed material to produce steam that in turn is steam reformed with the reformer, the target values of the respective flow rates of feed materials are delivered to the water supply unit 13 and the methanol supply unit 14 that supply feed materials to the evaporator 15 to enable controls of the respective flow rates of injector control units contained in the air supply unit 13 and the methanol supply unit 14 such that the volumes of respective feed materials (water and methanol) to be supplied to the evaporator 15 reach the relevant target values.

In succeeding step S30, current combustor temperature of the combustor 4 detected with the temperature sensor 5 is stored in the memory, not shown, of the control device 6.

In subsequent step S40, the power output value taken out from the fuel cell body 1 at current time is calculated on the basis of the voltage value detected with the voltage sensor 25 and the load current value detected with the current sensor 24 and is stored in the memory, not shown, of the control device 6. Such storing of data is implemented only when the increase in the demanded power output is newly recognized and is not executed during the demanded power output continuation previously mentioned, with the value of the previously stored power output remaining the same as before for use.

In next step S50, discrimination is made as to whether the amount of the increasing variation in the power output taken out from the fuel cell body 1 at a current timing is larger than the predetermined threshold value L1 or is below the same. Here, it is to be construed that the amount of the increasing variation in the power output refers to a value obtained by subtracting the current power output, taken out from the fuel cell body 1, from the value of the demanded power output which is increased.

Next, when it is discriminated in step S50 that the amount of the increasing variation in the power output exceeds the predetermined upper threshold value L1, the operation proceeds to step S60. In step S60, the threshold value TH, which is used for detecting the variation in the temperature rise of the combustor, is increased by only a predetermined magnitude of Δ TH (with a predetermined value of TH_INIT, TH=TH_INIT+Δ TH), and the operation proceeds to step S80. Also, such operation is executed only when there newly exists an increase in the demanded power output, whereas no operation is executed during the demanded power output continuation, and the operation proceed to step S80. Such situations similarly appear in steps S70, S72 and S74, with no such operation being executed during the demanded power output continuation period.

On the other hand, when it is discriminated in step S50 that the amount of the increasing variation in the power output is equal to or below the predetermined upper limit threshold value L1, the operation proceeds to step S70 in which discrimination is executed as to whether the currently resulting power output remains between the upper limit threshold value L1 and the lower limit threshold value L2 (L2<L1), i.e., whether the currently resulting power output is equal to or below L1 but above L2.

If it is discriminated in step S70 that the amount of the increasing variation in the power output remains between the upper limit threshold value L1 and the lower limit threshold value L2, then, the operation proceeds to step S72 which allows the temperature variation threshold value TH, which is used for detecting the temperature variation of the combustor 4 in step S72, to be preset to the threshold value of TH_INIT (TH=TH_INIT), and the operation proceeds to step S80. It is to be noted here that the predetermined threshold value of TH_INIT is a value preliminarily obtained from experimental tests.

On the contrary, if it is discriminated in step S70 that the amount of the increasing variation in the power output is out of a range between the upper limit threshold value L1 and the lower limit value L2, i.e., if it is discriminated that the amount of the increasing variation in the power output is equal to or below the value of L2, then the operation proceeds to step S74 which compels the temperature variation threshold value TH, which is used for detecting the temperature variation of the combustor 4, to be decreased by a predetermined magnitude of Δ TH (TH=TH_INIT−Δ TH), and the operation proceeds to step S80.

That is, in such branched steps, arranging the temperature variation threshold value, which is used for detecting the temperature variation of the combustor 4, to be determined at a higher level as the power output has a larger amount of the increasing variation enables detection of the presence of variation in the temperature of the combustor 4 in a reliable manner. Thus, should adverse affects such as noises appear, a measure is taken to preclude the occurrence of an erroneous recognition during such detection step to provide a capability of reliably confirming that the fuel gas remains at a sufficient flow rate in the gas supply line connected to the fuel electrode of the fuel cell body 1.

On the contrary, suppose that the threshold value for detecting the temperature variation in the combustor 4 was determined at a lower value, it is conceivable that if the presence of sufficient temperature variation is erroneously recognized in spite of an insufficient temperature variation of the combustor 4, the fuel cell is apt to be forced to produce a more power output than the electric power generating capacity. Especially, such a situation appears in such a way that the larger the amount of the increasing variation in the power output, i.e., the larger the variation value in the increase in the power output to be taken out from the fuel cell body 1, it becomes pronounced to take out a large power output in one breath.

Stated another way, in such branched steps in such cases, the reason why in a case where the amount of the increasing variation in the power output is larger than the predetermined value, the threshold value, to be used in detection of the temperature variation in the combustor 4, is determined at the higher level is to prevent the fuel cell body 1 from being adversely affected owing to the erroneous recognition caused by noises.

In next step S80, discrimination is made as to whether, starting from the current temperature stored in step S30, the temperature variation equal to or greater than the threshold value TH, which is for detecting the temperature rise variation and calculated in steps S60, S72 or S74, occurs in the combustor 4. In step S80, if the temperature of the combustor 4 is varied by a value equal to or greater than the threshold value TH, the operation proceeds to step S90. If, in contrast, no variation occurs in a value equal to or greater than the threshold value TH, the operation proceeds to step S100.

In succeeding step S90, operation is executed to permit an increase in the power output to be taken out from the fuel cell body 1, and the operation proceeds to step S120. On the other hand, in step S100, the operation is executed not to permit the increase in the power output to be taken out from the fuel cell body 1, and the operation proceeds to step S130.

In subsequent step S120, the target power output value P (t) to be taken out from the fuel cell body 1 is calculated to cause the temperature of the combustor 4 to reach the predetermined target value, and the operation proceeds to step S140. The target power output value P (t) can be calculated utilizing a PID control computation using the following formulae (1) to (3), $$P(t)=P(t-1)+\Delta P(t) \quad (1)$$

where t represents a time, Δ P(t) represents an increasing value in the power output to be taken out from the fuel cell body 1, with Δ P(t) being calculated from the following formula (2), $$\Delta P(t)=K^*\{(e(t)-e(t-1))+(T/Ti)^*e(t)+(TD/T)^*(e(t)-2^*e(t-1)+e(t-2))\} \quad (2)$$

where a multiplication operator is represented with "*", a deviation related to the temperature of the combustor 4 is represented with e(t), and K, Ti and TD represent control gains each of which has a meaning of a kind of adjusting parameter. Also, e(t) can be calculated from the following formula (3).

$$e(t)=\{(\text{Combustor Target Temperature }(t))-(\text{Detected Value }(t)\text{ of Combustor Temperature Sensor})\} \quad (3)$$

Also, the predetermined target value of the combustor temperature may be the combustor temperature prior to increasing the power output or may be altered in dependence on the amount of the increasing variation in the power output.

On the contrary, in step S130, since there is an instance without permission for the increase in the amount of power output to be taken out from the fuel cell body 1, the target power output value to be taken out from the fuel cell body 1 so maintained as to remain in the previous value (maintained in the status quo), and the operation proceeds to step S140.

Finally, in step S140, the target power output value to be taken out from the fuel cell body 1 is outputted to an output taking out unit such as the load 10, and the operation returns to "START".

Also, among the above steps, the steps S10 to S80 are executed by the combustor temperature variation discriminator section 7, the steps S90, S100 and S150 are executed by the power output approval section 9, and steps S120 to S140 are executed by the target power output value calculator section 8.

Now, the operation of the control device 6 is described below with reference to a timing diagram of FIGS. 4A to 4D.

Figure 4A:
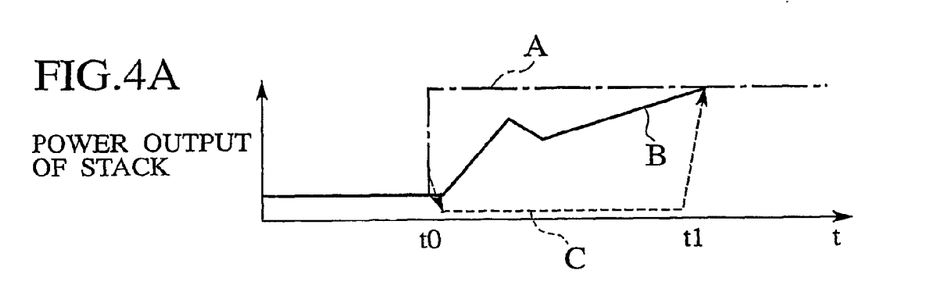
FIGS. 4A to 4D are timing charts of various signals correlated with the basic sequence of operations of the flow diagram shown in FIG. 3 of the first embodiment.
Figure 4B:
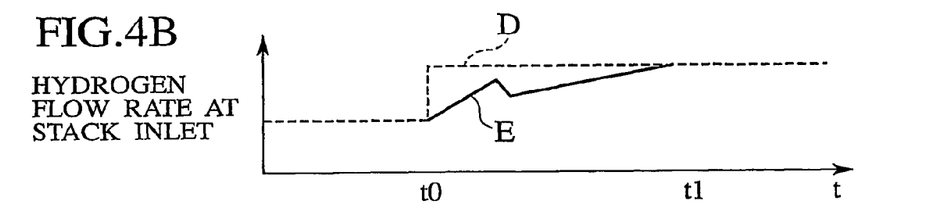
Figure 4C:
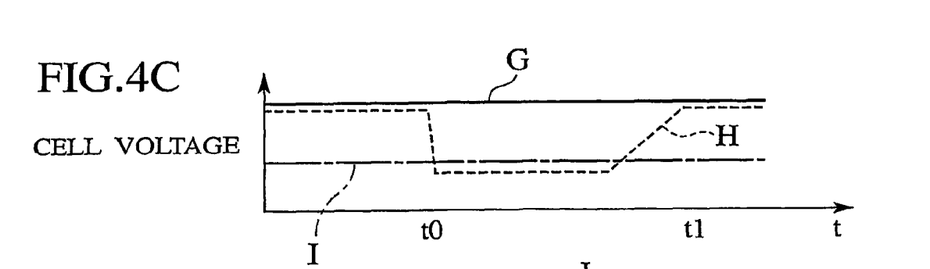
Figure 4D:
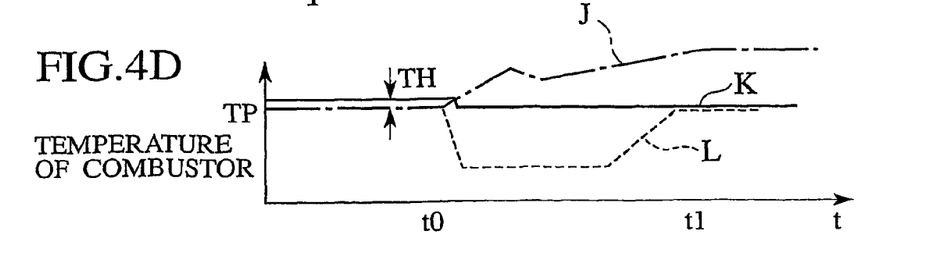

FIG. 4A shows a variation in the power output of the fuel cell body (stack) 1 plotted in terms of time, FIG. 4B shows a variation in hydrogen flow rate at the inlet of the stack 1 plotted in terms of time, FIG. 4C shows a cell voltage of the stack 1 plotted in terms of time, and FIG. 4D shows the temperature of the combustor 4 plotted in terms of time.

In FIG. 4A, when the demanded power output begins to increase at a time instant t0 as shown by a single dot line A, comparison is made between a variation in the power output available from the fuel cell body in a case of the presently filed embodiment indicated by a solid line B and a variation in the power output, as shown by a dotted line C, in a case where the hydrogen flow rate value is estimated from the flow rates of feed materials, supplied to the reformer, and the temperature of the reformer. Also, a relevant estimated value is shown by a dotted line D in FIG. 4B and is deviated in value from an actual flow rate as shown by a solid line E in the figure.

More particularly, as shown in FIG. 4C, if the hydrogen flow rate is estimated and the power output is taken out from the stack on the basis on a resulting estimated value, the power output is apt to be taken out from the stack at a large rate exceeding the power generation capacity thereof and, hence, the cell voltage rapidly drops below an abnormal voltage line I as indicated by a dotted line H. Also, there exists a deviation between the estimated value and the actual flow rate of hydrogen gas until the time instant t1 and, therefore, it is hard for the power output to be taken out from the stack until the time instant t1 as shown by the dotted line C in FIG. 4A. Further, the temperature of the combustor 4 comes to sharply drop as shown by a dotted line L in FIG. 4D. On the contrary, according to the presently filed embodiment, after the temperature of the combustor 4 is raised from the predetermined temperature TP (temperature prior to the increase in the demanded power output) to a level equal to or above TH as shown in FIG. 4D, the power output to be taken out from the stack 1 begins to increase as shown by the solid line B in FIG. 4A while, at the same time, controlling the temperature of the combustor 4 at a level that is not lower than the predetermined temperature TP. This results in a capability of causing the cell voltage to be maintained at a constant level as shown by a solid line G in FIG. 4C. Thus, deterioration of the fuel cell stack can be avoided, and it is possible for the power output to be taken out from the stack at a rate as high as possible. Also, a single dot line J in FIG. 4D represents the temperature variation of the combustor 4 in a case that no hydrogen was consumed in the stack 1.

(Second Embodiment)

Figure 6:
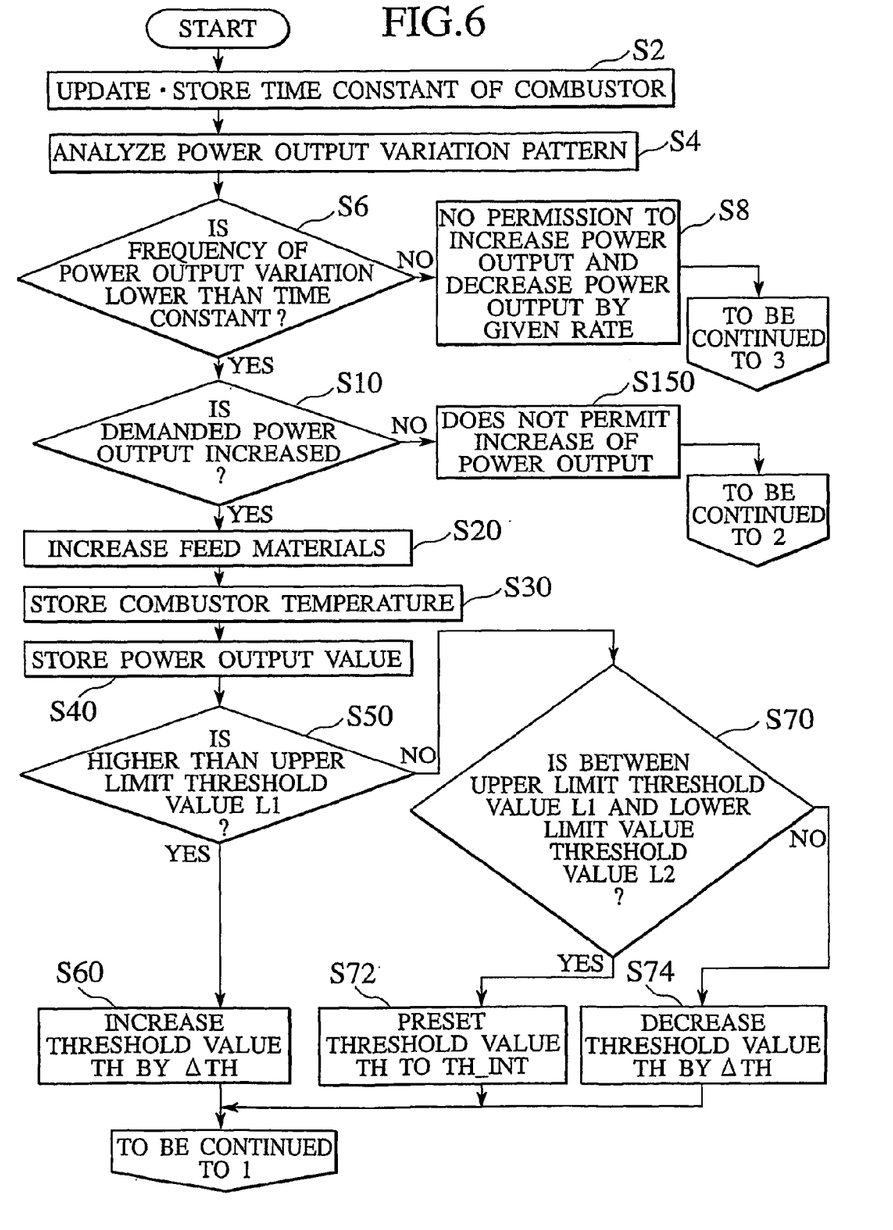
FIGS. 6 and 7 are continuous general flow diagrams for illustrating the basic sequence of operations of the control device shown in FIG. 5 of the second embodiment.
Figure 7:
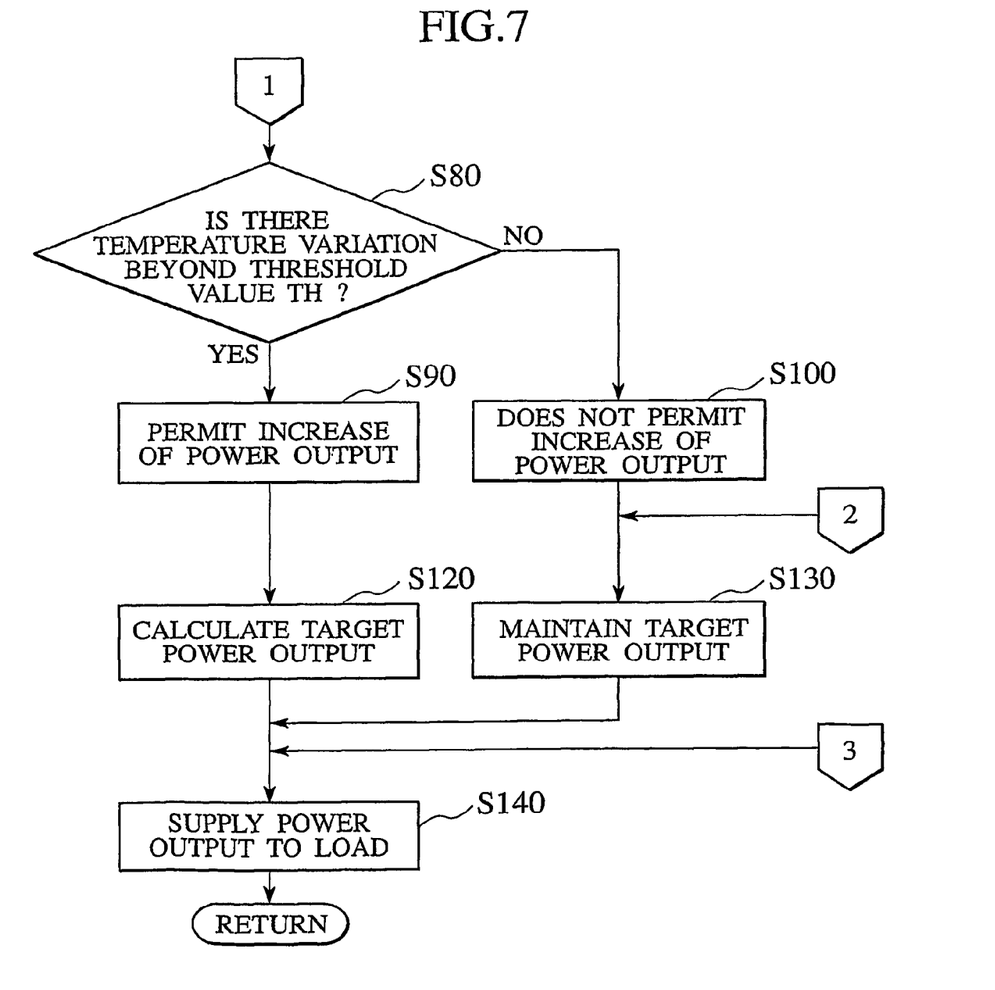

Next, the control device for a fuel cell system and a control method a second embodiment according to the present invention is described below in detail mainly with reference to FIGS. 5 to 7.

The presently filed embodiment is fundamentally identical in structure with the first embodiment except for that a fuel cell system S additionally includes a time constant storage update section 21 and a demanded power output variation speed discriminator section 22. The time constant storage update section 21 and the demanded power output variation speed discriminator section 22 are contained in memories, not shown, of the control device 6 as software programs. The like parts bear the same reference numerals as those used in the first embodiment to omit a redundant description and described below with an attention being focused on different points.

Figure 5:
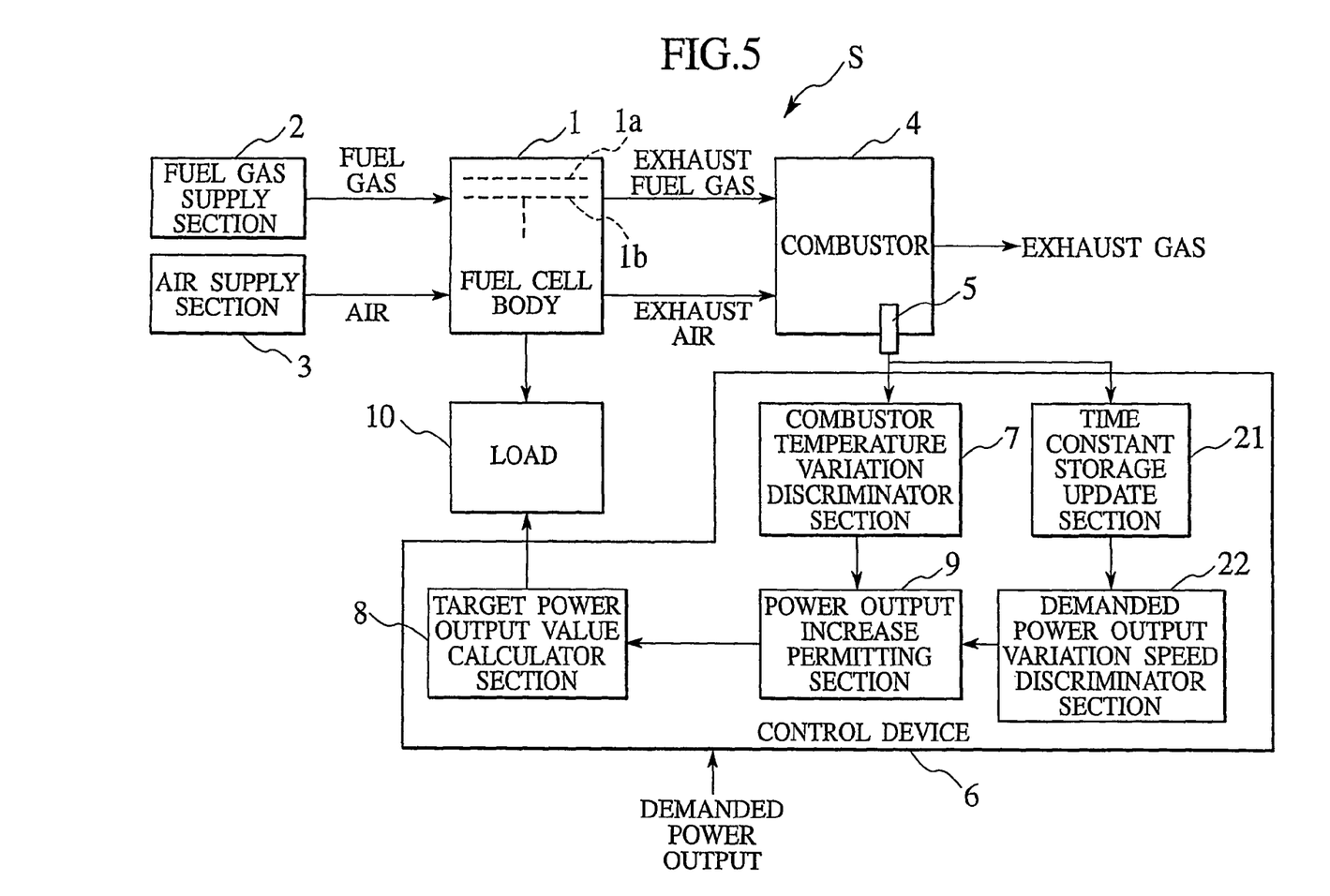
FIG. 5 is a block diagram illustrating a structure of a control device for a fuel cell system of a second embodiment according to the present invention.

In FIG. 5, the time constant storage update section 21 stores a time constant of the temperature variation of the combustor 4 and updates such a stored time constant. The demanded power output variation speed discriminator section 22 compares a variation speed (frequency), in a case where repeated operations are executed to decrease and increase the demanded power output of the fuel cell body 1, and the time constant of the temperature variation of the combustor 4. With such a structure, in an event that the variation speed of the demanded power output of the fuel cell body 1 exceeds the time constant of the temperature variation of the combustor 4, it is possible for the target power output value of the fuel cell body 1 to be decreased by a predetermined value. That is, even in a case where the repeated operations are executed to increase and decrease the demanded power output at the variation speed in a range exceeding the time constant of the temperature variation of the combustor 4, the fuel cell body 1 is operated at a reduced power rate while avoiding the erroneous discrimination based on the combustor temperature caused by an inability of responding to the variation in the demanded power output, providing a capability of preventing the fuel cell system S from being halted to enable continued operation to produce the desired power output.

Now, the operation of the presently filed embodiment is described with reference to FIGS. 6 and 7 with an attention being focused onto specific points different from the first embodiment.

First, in step S2, the time constant of the temperature variation of the combustor 4 is stored or the stored time constant is updated to a new value obtained by learning. When conducting a test for measuring the time constant, in a case where, during a normal operation of the fuel cell system, the flow rates of feed materials to be supplied to the evaporator 15 are slightly reduced to thereby decrease the flow rates of exhaust hydrogen gas and exhaust air to be combusted in the combustor 4, operation is executed to collect and analyze time series data, of the time variation of the combustor 4, subsequent to the reduction in the flow rates of exhaust hydrogen gas and exhaust air to be combusted in the combustor 4 for thereby obtaining the time constant of the temperature variation of the combustor 4. The time constant thus obtained is stored in the memory, not shown, of the control device 6, or if the previous time constant is stored in the memory, then the previous time constant is updated with new data which is stored. Storing the time constants of the temperature variations of the combustor 4 in various situations or updating and storing the time constant provides a capability of accommodating variation per hour of the fuel cell system involving the combustor 4, thereby precluding the erroneous discrimination due to the variation per hour.

In succeeding step S4, time series data of the demanded power output going back for a predetermined elapsed time from current time is analyzed, thereby obtaining the variation speed (also referred to as the frequency) of the variation in a series of demanded power outputs that would appear when particular patterns, in which the demanded power output is varied in a series of decrease→ increase (decrease and its following increase, and so on), are consecutively repeated or when other particular patterns, in which the demanded power output is varied in a sequence of increase→ decrease→ increase (increase, its following decrease and its following increase, and so on), are consecutively repeated.

In succeeding step S6, operation is executed referring to the variation speed of the variation in the demanded power output obtained in step S4 and discrimination is made as to whether such a variation speed is slower than the temperature variation in terms of the time constant of the combustor stored in step S2. And, if it is discriminated that the variation speed is fast (NO), it is regarded that the fuel cell system comes close to a situation to encounter a performance limitation to follow the variation in the demanded power output, and the operation proceeds to step S8.

By the way, when repetitively performing the operations between the increase and decrease in the demanded power output, studies have to be done for a particular situation in which the demanded power output is increased again under a condition where the demanded power output begins to decrease from a status in that the temperature of the combustor 4 is raised according to the increase in the demanded power output with an accompanied increase in the flow rate of reformed gas to be supplied and then the temperature of the combustor 4 gradually drops due to the time constant of the dropping variation in the temperature of the combustor 4. In such a particular situation, due to the fact that the temperature of the combustor 4 does not adequately drops and still remains at the high temperature condition even when the flow rate of hydrogen gas is not fully increased yet, it is conceivable that by judging from the temperature of the combustor 4, erroneous discrimination in which the hydrogen flow rate remains at the sufficient level is induced to cause the fuel cell body 1 to be forcedly taken out the power output at the rate greater than the electric power generating capacity thereof.

That is, this means that it is no longer hard for the fuel cell system to follow even if the demanded power output undergoes variation in a sequence of increase→ decrease→ increase at the higher speed (frequency) than the time constant of the gas supply sections 2, 3 of the fuel cell system and the time constant of the temperature variation characteristic of the combustor 4. Thus, it is hard for the flow rate of reformed gas, flowing through the supply line extended to the fuel electrode of the fuel cell body 1, to follow or for the temperature variation of the combustor 4. Thus, a so-called limitation in the response speed of the fuel cell system is judged so as to preclude a provability of causing the gas supply condition to be erroneously judged on the basis of the temperature of the combustor 4, under a condition where the temperature of the combustor 4 does not reflect the flow rate of gas supplied to the fuel electrode, to prevent the fuel cell body 1 from being forced to produce the power output at the rate greater than the electric power generating capacity.

In subsequent step S8, permission for the increase in the power output to be taken out from the fuel cell body 1 is interrupted and also, operation is executed to reduce the power output available from the fuel cell body 1 by a predetermined rate. By performing such operations, it is possible to effectively prevent the fuel cell body 1 from being forced to produce the power output at the rate greater than the electric power generating capacity, providing a capability of allowing the operation to continue without causing the fuel cell system to fall in an abnormal halt condition.

On the other hand, if it is judged that the speed of the demanded power output variation obtained in step S4 is slower than the time instant stored in step S2, the operation proceeds to step S10, and steps subsequent to step S20 are executed in the same manner as those of the first embodiment.

Also, the operation of step S2 is executed with the time constant storage update section 21, and operations of steps S4 to S8 are executed with the demanded power output variation speed discriminator section 22.

Further, it may be of course structured such that in compliance with a case in which the increase in the power output is not permitted in step S8, a separate power supply such as a secondary battery is prepared to compensate for the power output which is not available from the fuel cell body 1 so as to cope with the demanded power output.

The entire content of a Patent Application No. TOKUGAN 2001-317968 with a filing date of Oct. 16, 2001 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

INDUSTRIAL APPLICABILITY

As set forth above, since the present invention has a structure in which if it is judged that the temperature rise of the combustor of the fuel cell system is equal to or above the predetermined threshold value, the operation is executed to permit the increase in the power output to be taken out from the fuel cell body, it is possible to effectively avoid deterioration in the fuel cell. Accordingly, the present invention has wide application ranges involving a fuel cell powered motor vehicle which adopts such a fuel cell system.

The invention claimed is:

1. A control device for a fuel cell system, comprising:
a fuel cell body;
a fuel gas supply system supplying fuel gas to the fuel cell body in dependence on a demanded power output of the fuel cell body;
an air supply system supplying air to the fuel cell body in dependence on the demanded power output;
a combustor combusting exhaust gases exhausted from the fuel cell body;
a temperature sensor sensing a temperature of the combustor;
a temperature variation discriminator section discriminating whether an increase in the temperature detected with the temperature sensor is equal to or above a predetermined threshold value when there is an increase in the demanded power output; and
a power output increase permitting section permitting the power output available from the fuel cell body to be increased when it is discriminated by the temperature variation discriminator section that the increase in the temperature is equal to or above the predetermined threshold value.

2. The control device for the fuel cell system according to claim 1, further comprising a target power output value calculator section calculating a target power output value of the fuel cell body,
wherein the target power output value of the fuel cell body is set to a value such that when the power output increase permitting section permits the power output to be increased, the temperature of the combustor is maintained at a predetermined level.

3. The control device for the fuel cell system according to claim 2, wherein the predetermined temperature corresponds to the temperature of the combustor prior to the increase in the demanded power output.

4. The control device for the fuel cell system according to claim 1, wherein the threshold value to be used in the temperature variation discriminator section is determined such that when there is the increase in the demanded power output, the larger an amount of the increase in the demanded power output is, the larger the threshold value is.

5. The control device for the fuel cell system according to claim 4, wherein it is determined that the threshold value is to be increased when the amount of the increase in the demanded power output exceeds a predetermined range and the threshold value is to be decreased when the amount of the increase in the demanded power output is lower than the predetermined range.

6. The control device for the fuel cell system according to claim 1, further comprising:
a time constant storing section storing a time constant of a temperature variation of the combustor; and
a variation speed discriminator section comparing a variation speed of the demanded power output of the fuel cell body, when a decrease in the demanded power output and the increase in the demanded power output are consecutively executed, and the time constant, to discriminate the relationship between the variation speed and the time constant.

7. The control device for the fuel cell system according to claim 6, wherein when the variation speed exceeds the time constant, a target power output value of the fuel cell body is reduced by a predetermined value.

8. The control device for the fuel cell system according to claim 1, wherein a time constant storing section learns the time constant of the temperature variation of the combustor and updates the time constant stored therein.

9. The control device for the fuel cell system according to claim 1, wherein the temperature variation discriminator section discriminates whether the increase in the temperature detected with the temperature sensor is equal to or above the predetermined threshold value, while issuing a command so as to increase a supply amount of fuel gas, when there is the increase in the demanded power output,
and wherein the power output increase permitting section permits the power output available from the fuel cell body to be increased in a state where the command is issued so as to increase the supply amount of fuel gas and when it is discriminated by the temperature variation discriminator section that the increase in the temperature is equal to or above the predetermined threshold value.

10. A control device for a fuel cell system, comprising:
a fuel cell body;
a fuel gas supplying means for supplying fuel gas to the fuel cell body in dependence on a demanded power output of the fuel cell body;
an air supplying means for supplying air to the fuel cell body in dependence on the demanded power output;
a combusting means for combusting exhaust gases exhausted from the fuel cell body;
a temperature sensing means for sensing a temperature of the combusting means;
a temperature variation discriminating means for discriminating whether an increase in the temperature detected with the temperature sensing means is equal to or above a predetermined threshold value when there is an increase in the demanded power output; and
a power output increase permitting means for permitting the power output available from the fuel cell body to be increased when it is discriminated by the temperature variation discriminating means that the increase in the temperature is equal to or above the predetermined threshold value.

11. The control device for the fuel cell system according to claim 10, wherein the temperature variation discriminating means discriminates whether the increase in the temperature detected with the temperature sensing means is equal to or above the predetermined threshold value, while issuing a command so as to increase a supply amount of fuel gas, when there is the increase in the demanded power output,
and wherein the power output increase permitting means permits the power output available from the fuel cell body to be increased in a state where the command is issued so as to increase the supply amount of fuel gas and when it is discriminated by the temperature variation discriminating means that the increase in the temperature is equal to or above the predetermined threshold value.

12. A control method for a fuel cell system having a fuel cell body, a fuel gas supply system supplying fuel gas to the fuel cell body in dependence on a demanded power output of the fuel cell body, an air supply system supplying air to the fuel cell body in dependence on the demanded power output, and a combustor combusting exhaust gases exhausted from the fuel cell body, the control method comprising:
detecting a temperature of the combustor;
discriminating whether an increase in the temperature thus detected is equal to or above a predetermined threshold value when the demanded power output increases; and
permitting the power output available from the fuel cell body to be increased when it is discriminated that the increase in the temperature is equal to or above the predetermined threshold value.

13. The control method for the fuel cell system according to claim 12, wherein it is discriminated whether the increase in the temperature as detected is equal to or above the predetermined threshold value, while issuing a command so as to increase a supply amount of fuel gas, when the demanded power output increases,
and wherein the power output available from the fuel cell body is permitted to be increased in a state where the command is issued so as to increase the supply amount of fuel gas and when it is discriminated that the increase in the temperature is equal to or above the predetermined threshold value.

* * * * *